United States Patent
DiGiorgio et al.

(10) Patent No.: US 6,877,094 B1
(45) Date of Patent: Apr. 5, 2005

(54) METHOD AND APPARATUS FOR AUTHENTICATION AND PAYMENT FOR DEVICES PARTICIPATING IN JINI COMMUNITIES

(75) Inventors: Rinaldo DiGiorgio, Easton, CT (US); Stephen Uhler, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 916 days.

(21) Appl. No.: 09/627,848

(22) Filed: Jul. 28, 2000

(51) Int. Cl.[7] ................................................ G06F 11/30
(52) U.S. Cl. ..................... 713/176; 713/180; 713/200; 713/201
(58) Field of Search ................ 713/176, 180, 713/200, 201

(56) References Cited

U.S. PATENT DOCUMENTS 5,768,382 A * 6/1998 Schneier et al. ............ 380/251
5,970,143 A * 10/1999 Schneier et al. ............ 713/181
6,018,724 A * 1/2000 Arent .......................... 705/44

* cited by examiner

*Primary Examiner*—Thomas R. Peeso
(74) *Attorney, Agent, or Firm*—Gunnison, McKay & Hodgson, L.L.P.; Philip J. McKay (57) ABSTRACT

Architectures that enable different types of security devices to operate interchangeably in very large network environments for authentication and metered access to services are described. The system relies on a lease-based access to the network services. The leasing model supports a smart card type payment for services allowing for payments to be automatically forwarded from the smart card type device to the service whenever a service is leased. To lease a service, the requesting service must first be authenticated using devices like cellular phones, smart cards, Personal Data Assistants, or similar devices that have processing and memory capabilities and in some instances, wireless communication capabilities. Services may enter or exit the environment at will. Devices and services in this environment have public certificates that are used for authentication. Services may customize access to its products to make them available only to desired services.

6 Claims, 4 Drawing Sheets

FIG. 4

METHOD AND APPARATUS FOR AUTHENTICATION AND PAYMENT FOR DEVICES PARTICIPATING IN JINI COMMUNITIES

FIELD OF THE INVENTION

The present invention relates to authentication and payment systems. More specifically to methods and apparatus for authentication, authorization and payments for services by devices participating in a Jini environment as an enhancement to Jini technology.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views, Jini and all Java-based trademarks and logos are trademarks or registered trademarks of Sun Microsystems, Inc., in the United States and other countries. All SPARC trademarks are used under license and are trademarks of SPARC International, Inc., in the United States and other countries. Products bearing SPARC trademarks are based upon an architecture developed by Sun Microsystems, Inc.

BACKGROUND OF THE INVENTION

As networks continue to grow users are often disconnecting and connecting to the network much more. Wireless communication makes it possible for networks to create themselves spontaneously as devices with the proper protocol enter the area of influence of the network. Several new technological developments like Jini Technology, Java Card™ GSM (Global System for Mobile) smart cards, Java capable cellular phones, and UPI (Universal Resource Locator Programming Interface) addressable servers, when brought together provide an easier way for building and deploying authentication, authorization, and payment infrastructure on networks. Hereafter, authentication is inclusive of all three processes: authentication, authorization, and payment.

Modern secure authentication schemes often require something you have and something you know. Often the something you have is a smart card. One of the problems with deploying smart cards is that they require smart card readers, which add costs and if the reader does not have an integral keypad for PIN (Personal Identification Number) entry they are still vulnerable to data keyboard sniffing. A convergence of the Personal Data Assistant and the cellular phone can provide devices for user authentication with the actual security mechanism hidden from the user. That is, the smart card will be on the circuit board; the user will not be required to insert the smart card like today's credit cards. Removable smart cards will also add another step as data on these devices grow and also because of the desire to have all related data in one place. Currently, some removable smart cards that enable secure computing devices are provided in jewelry form factor.

The following definitions are necessary to fully understand the present invention.
Jini Architecture:
A Jini system is a distributed system federating groups of users and the resources required by those users. A Jini architectural network is a flexible, easily administered tool on which human and computational clients can find resources. Resources can be hardware devices, software programs, or a combination of the two. The system makes the network a more dynamic entity that better reflects the dynamic nature of technology by enabling the ability to add and delete services flexibly.

The Jini system enables users to share services and resources over a network, provides users easy access to resources anywhere on the network while allowing the network location of the user to change, and simplifies the task of building, maintaining, and altering a network of devices, software, and users.

Jini extends the Java application environment from a single virtual machine to a network of machines. The Java application environment provides a good computing platform for distributed computing because both code and data can move from machine to machine. The environment has built-in security that allows the confidence to run code downloaded from another machine. Strong typing in the Java application environment enables identifying the class of an object to be run on a virtual machine even when the object did not originate on that machine. The result is a system in which the network supports a fluid configuration of objects which can move from place to place as needed and can call any part of the network to perform operations.

The Jini architecture exploits these characteristics of the Java application environment in the construction of a distributed system. The Jini architecture adds mechanisms that allow fluidity of all components in a distributed system, extending the easy movement of objects to the entire networked system.

The Jini technology infrastructure provides mechanisms for devices, services, and users to join and detach from a network. Joining into and leaving a Jini system is an easy and natural, often automatic, occurrence. Jini systems are far more dynamic than is possible in some networked groups where configuring a network is a centralized function done by hand.

The Jini system federates computers and computing devices into what appears to the user as a single system. It relies on the existence of a network of reasonable speed connecting those computers and devices. Each Jini technology-enabled device has some memory and processing power. Devices without processing power or memory may be connected to a Jini system, but those devices are controlled by another piece of hardware and/or software, called a proxy, that presents the device to the Jini system and which itself contains both processing power and memory.

The Jini system is Java technology-centered. The ability to dynamically download and run code is central to a number of the features of the Jini architecture. However, the Java technology-centered nature of the Jini architecture depends on the Java application environment rather than on the Java programming language. Any programming language can be supported by a Jini system if it has a compiler that produces compliant bytecodes for the Java programming language.

The Jini architecture is a federated group of devices and software components that function as a single dynamic distributed system. The resulting federation provides the simplicity of access, ease of administration, and support for sharing that are provided by a large monolithic system while retaining the flexibility, uniform response, and control provided by a personal computer or workstation.

The most important concept within the Jini architecture is that of a service. A service is an entity that can be used by a person, a program, or another service. A service may be a computation, storage, a communication channel to another user, a software filter, a hardware device, or another user. Two examples of services are printing a document and personal services. Personal services, for example, may be a matrix that includes data items like: your shoe size, birth date, dining preferences, spending habits, etc (i.e., things that other Jini clients may use to provide the services you may need). The data may also include who may have access to individual items in your personal services matrix.

The Jini technology infrastructure and programming model are built to enable services to be offered and found in the network federation. These services make use of the infrastructure to make calls to each other, to discover each other, and to announce their presence to other services and users.

Services appear programmatically as objects written in the Java programming language, perhaps made up of other objects. A service has an interface which defines the operations that can be requested of that service. Some of these interfaces are intended to be used by programs, while others are intended to be run by the receiver so that the service can interact with a user. The type of the service determines the interfaces that make up that service and also define the set of methods that can be used to access the service. A single service may be implemented by using other services.

Members of a Jini system federate in order to share access to services. A Jini system consists of services that can be collected together for the performance of a particular task. Services may make use of other services, and a client of one service may itself be a service with clients of its own. The dynamic nature of a Jini system enables services to be added or withdrawn from a federation at any time according to demand, need, or the changing requirements of the clients using it.

Services in a Jini system communicate with each other by using a service protocol, which is a set of interfaces written in the Java programming language. The set of such protocols is open ended. The base Jini system defines a small number of such protocols which define critical service interactions.

Services in a Jini environment are found and resolved by a lookup service. The lookup service is the central bootstrapping mechanism for the system and provides the major point of contact between the system and users of the system. In precise terms, a lookup service maps interfaces indicating the functionality provided by a service to sets of objects that implement the service. In addition, descriptive entries associated with a service allow more fine-grained selection of services based on properties understandable to people.

Objects in a lookup service may include other lookup services; this provides hierarchical lookup. Further, a lookup service may contain objects that encapsulate other naming or directory services, providing a way for bridges to be built between a Jini Lookup service and other forms of lookup service. Of course, references to a Jini Lookup service may be placed in these other naming and directory services, providing a means for clients of those services to gain access to a Jini system.

The Jini technology employs a security model based on the twin notions of a principal and an access control list. Jini services are accessed on behalf of some entity—the principal, which generally traces back to a particular user of the system. Services themselves may request access to other services based on the identity of the object that implements the service. Whether access to a service is allowed depends on the contents of an access control list that is associated with the object.

Access to many of the services in the Jini system environment is lease based. A lease is a grant of guaranteed access over a time period. Each lease is negotiated between the user of the service and the provider of the service as part of the service protocol: A service is requested for some period; access is granted for some period, presumably taking the request period into account. If a lease is not renewed before it is freed-either because the resource is no longer needed, the client or network fails, or the lease is not permitted to be renewed-then both the user and the provider of the resource may conclude the resource can be freed.

Leases are either exclusive or non-exclusive. Exclusive leases insure that no one else may take a lease on the resource during the period of the lease; non-exclusive leases allow multiple users to share a resource.

The heart of the Jini system is a trio of protocols called discovery, join, and lookup. A pair of these protocols-discovery/join-occurs when a device is plugged in. Discovery occurs when a service is looking for a lookup service with which to register. Join occurs when a service has located a lookup service and wishes to join it. Lookup occurs when a client or user needs to locate and invoke a service described by its interface type (written in the Java programming language) and possibly, other attributes.

Discovery/join is the process of adding a service to a Jini system. A service provider is the originator of the service—a device or software, for example. First, the service provider locates a lookup service by multicasting a request on the local network for any lookup services to identify themselves. Then, a service object for the service is loaded into the lookup service. This service object contains the Java or similar programming language interface for the service including the methods that users and applications will invoke to execute the service, along with any other descriptive attributes.

Services must be able to find a lookup service; however, a service may delegate the task of finding a lookup service to a third party. A client locates an appropriate service by its type—that is, by its interface written in the Java programming language—along with descriptive attributes which are used in a user interface for the lookup service. The service object is loaded into the client.

The service object's methods may implement a private protocol between itself and the original service provider. Different implementations of the same service interface can use completely different interaction protocols.

The ability to move objects and code from the service provider to the lookup service and from there to the client of the service gives the service provider great freedom in the communication patterns between the service and its clients. This code movement also ensures that the service object held by the client and the service for which it is a proxy are always synchronized, because the service object is supplied by the service itself. The client only knows that it is dealing with an implementation of an interface written in the Java or similar programming language, so the code that implements the interface can do whatever is needed to provide the service. Because this code came originally from the service itself, the code can take advantage of implementation details of the service known only to the code.

The client interacts with a service via a set of interfaces written in the Java or similar programming language. These interfaces define the set of methods that can be used to interact with the service. Programmatic interfaces are identified by the type system of the Java or similar programming language, and services can be found in a lookup service by asking for those that support a particular interface. Finding a service this way ensures that the program looking for the service will know how to use that service, because that use is defined by the set of methods that are defined by the type.

Programmatic interfaces may be implemented either as RMI (Remote Methods Invocation) references to the remote object that implements the service, as a local computation that provide all of the service locally, or as some combination. Such combinations, called smart proxies, implement some of the functions of a service locally and the remainder through remote calls to a centralized implementation of the service.

A user interface can also be stored in the lookup service as an attribute of a registered service. A user interface stored in the lookup service by a Jini service is an implementation that allows the service to be directly manipulated by a user of the system.

In effect, a user interface for a service is a specialized form of the service interface that enables a program, such as a browser, to step out of the way and let the human user interact directly with a service.

In situations where no lookup service can be found, a client could use a technique called peer lookup instead. In such situations, the client can send out the same identification packet used by a lookup service to request service providers to register. Service providers will then attempt to register with the client as though it were a lookup service. The client can select those services it needs from the registration requests it receives in response and drop or refuse the rest.

From the service client's point of view, there is no distinction between services that are implemented by objects on a different machine, services that are downloaded into the local address space, and services that are implemented in hardware. All of these services will appear to be available on the network, will appear to be objects written in the Java or similar programming language, and, only as far as correct functioning is concerned, one kind of implementation could be replaced by another kind of implementation without change or knowledge by the client (note that security permissions must be properly granted).

Java Remote Method Invocation (RMI):

Communication between services can be accomplished using Java Remote Method Invocation (RMI). The infrastructure to support communication between services is not itself a service that is discovered and used but is, rather, a part of the Jini technology infrastructure. RMI provides mechanisms to find, activate, and garbage collect object groups.

Fundamentally, RMI is a Java-programming-language-enabled extension to traditional remote procedure call mechanisms. RMI allows not only data to be passed from object to object around the network but full objects, including code. Much of the simplicity of the Jini system is enabled by this ability to move code around the network in a form that is encapsulated as an object.

Short Message Service

SMS is a service for sending messages of up to 160 characters to mobile phones that use Global System for Mobile (GSM) communication. SMS messages can be transmitted to digital phones from a Web equipped with PC link or from one digital phone to another.

URL Programming Interface (UPI)

Developing consistent, reliable Web applications that interface to different devices-such as home networks, home automation systems, or real-time process control devices—can be vastly simplified by treating devices as URLS. The URL programming interface (UPI) effectively provides a set of URLs for a device that are available to any application capable of performing the HTTP (HyperText Transfer Protocol.) HTTP has become so universal that in college computer courses students are often given as an assignment the creation of an HTTP stack. This trend is due to the growing interest in connecting devices to the Internet. Sun Microsystems Laboratories has used the Java™ language to develop a technology that allows users to deploy a very small HTTP stacks, with a core of less than 100 KB. However, the claimed invention can be practiced using any computer programming language.

These small HTTP servers can be run on any embedded device or used as application servers that are similar to traditional Web servers. Such minimal servers provide an integrated presentation and service layer for a device. Because a Web server answers URL requests, universal access to devices from any Internet node is achieved. UPI provides an interface to allow applications, including web applications, to access any device as if the device is a file resident on a web server, if the device can perform the HTTP protocol.

The UPI architecture, at its core, consists of a series of handlers that are similar to servlets, but have fewer features. These handlers are mapped to incoming URL requests. This allows the UPI function on very small devices, such as a TINI board. The UPI supplies handlers for web services such as file service and CGI script execution. Application developers can develop handlers for Internet aware devices (IADs) simply by coding a few required methods, such as init and respond, along with code that understands the applicable device grammar.

SUMMARY OF THE INVENTION

The present invention describes architectures that enable different types of security devices to operate interchangeably in very large networks for authentication and metered access to services. An embodiment of the invention is an enhancement to Jini technology and presents a universal method for authentication, authorization, and payment for services participating in a Jini or equivalent network environment.

Access to the network services is lease based. The leasing model supports a smart card type payment for services. Fees for services are published. For example, a printer tells how much for color copies, for printing graphics, etc. Payments are automatically forwarded from the smart card type device to the service whenever a service is leased. To accomplish automatic payment, a universal payment and billing system that uses the Jini Application Programming Interface (API) is employed. The billing system automatically establishes what the payment should be for certain services.

Public certificates are issued to entities that want to engage in the Jini environment and provide services. These public certificates are used for authentication. A user can therefore customize access to its services to make them available to only those other services as the user desires.

Authentication devices include cellular phones, smart cards, Personal Data Assistants, or similar devices that have processing and memory capabilities.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for authentication and payment for devices participating in Jini communities. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

The present invention describes architectures that enable different types of security devices to operate interchangeably in very large networks for authentication and metered access to services. Authentication, as used in this specification, is inclusive of authentication, authorization, and payment.

Clients in a network environment (e.g. Jini) subscribe to services that have associated costs. Currently there is no universal method of billing and authentication for services by devices participating in a Jini or equivalent environment. The present invention is an enhancement to Jini technology.

Embodiments of the invention may be implemented in devices participating in any network environment including but not limited to those devices that subscribe to the Jini architecture. The description, examples, and implementations described in this patent document may refer to or utilize the Java programming language for devices participating in a Jini architectural network, but the invention is neither limited to the use of the Java programming language nor Jini architecture but may be implemented in any language or network environment.

A Jini environment may comprise of businesses, customers, vendors, devices, services, etc. Each entity in the environment may join or exit the environment at will. Entities that wish to join are included in the network as soon as they are within the vicinity of the network. For example, a customer that walks through the doors of a department store is spontaneously included into a network comprising the store and its services.

Each entity in the environment may provide some kind of service. For example, a printing service may be provided by a business; and a customer may provide personal service that includes information like the customer's date of birth, dining preferences, etc. Some of these services are enabling services which interact with each other to provide access to resources (other services provide the resource). Jini services have associated costs. An embodiment of the present invention provides means for collecting payment for Jini services.

Access to many of the services is lease based. The leasing model supports a smart card type payment for services. Fees for services are published. For example, a printer tells how much for color copies, for printing graphics, etc. Payments are automatically forwarded from the smart card type device (a smart card is a secure portable device with memory that can store user information such as a user's identification and a secret code used for authentication) to the service whenever a service is leased. To accomplish automatic payment, a universal payment and billing system that is understood by devices using the Jini Application Programming Interface (API) is used. The billing system automatically establishes what the payment should be for certain services.

Public certificates are issued to entities that want to engage in the Jini environment and provide services. These public certificates are used for authentication. A user can therefore customize access to its services to make them available to only those other services as the user desires. A personal services matrix can be as shown in Table 1 below. As shown, the user may customize to restrict access to only those entities that the user wants to grant access to.

TABLE 1

Personal Services Matrix

| SERVICES | ACCESS GRANT |
|---|---|
| Social Security Number | Lending Institutions |
| Shoe Size | Nordstrom Department Store |
| Dining Preferences | American Express |
| Birth Date | None |
| Spending Preferences | American Express |
| Medical History | Hospital, Doctor John Doe |
| Hobbies | Home Depot |

Figure 1:
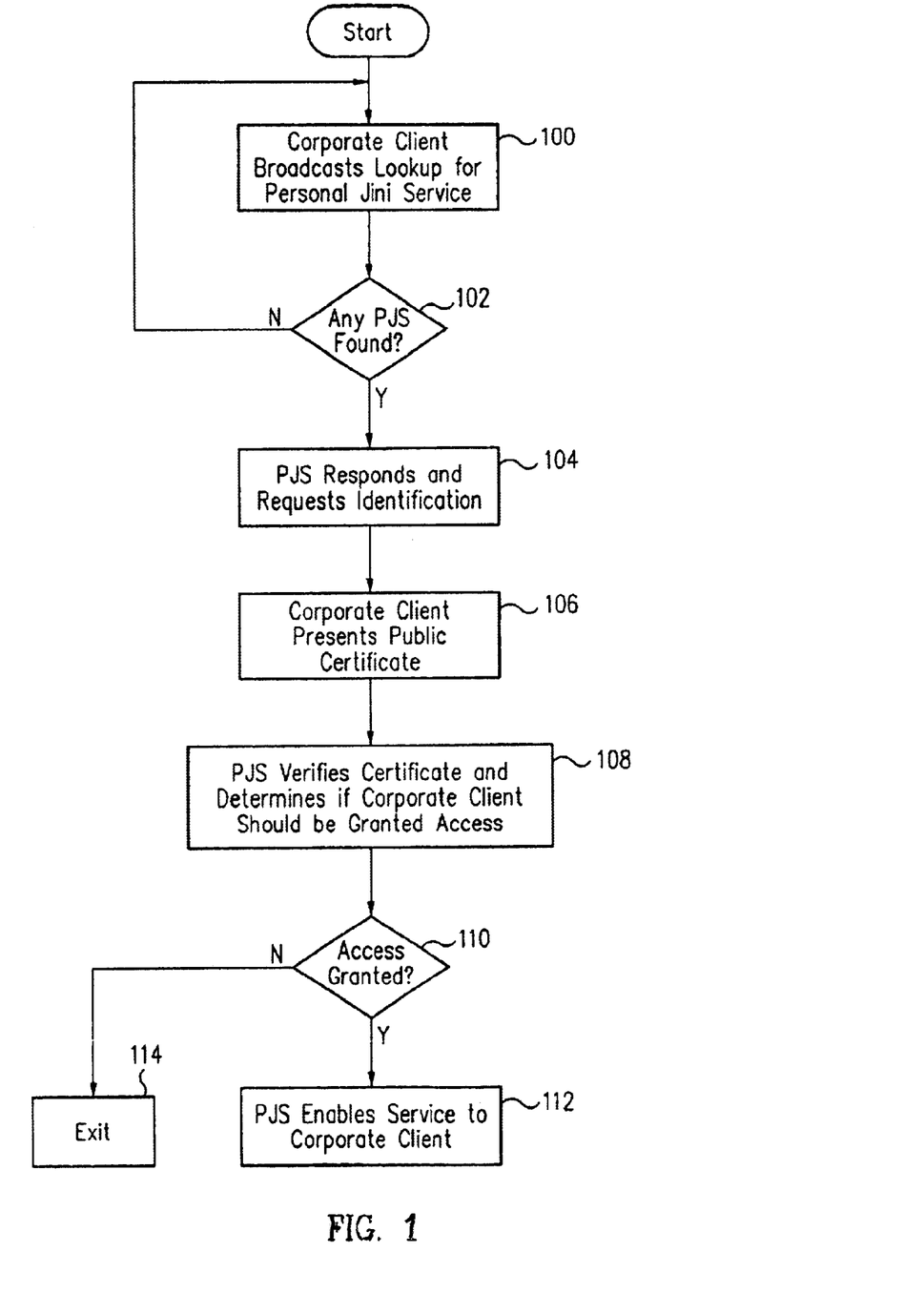
FIG. 1 shows a flow diagram of a service seeking to acquire information from another service on a network.

FIG. 1 is a flow diagram of how a service may search for Personal Jini Services (PJS) in the network environment. At step 100, a service (e.g. corporate client) that wants access to the personal services matrix broadcasts for a lookup service for personal Jini services. If at step 102, no personal Jini service on the network responds, the process continues at step 100 until there is a response. If at step 102, the personal Jini service for Superman (for example) is on the network, it will respond (e.g. "I am the personal Jini service for Superman") and processing proceeds to step 104 where Superman's personal Jini service asks for identification. At step 106, the requestor provides its public certificate to Superman's Jini service. After the certificate is verified and it is determined that the requester is permitted access to certain services in the personal services matrix (at step 108), access is granted at step 112. Any payments required for the services are automatically forwarded from the requestor to the responder. If however, at step 110, access is not granted, the process terminates at step 114 and the personal Jini service awaits other requests for service.

The above process could occur while the user approaches a turnstile with a device that has RF (Radio Frequency) capability. As the user approaches the turnstile, the lookup and authentication process occurs automatically, and the turnstile opens without the user physically doing anything. The payment is automatically billed to the users service.

Authentication for Access to a Door

In one embodiment of the invention, the user dials an authentication extension on their cellular phone as they approach the door. The dialed number is actually a web server (as described below) which sees the incoming number and sends back a challenge using SMS (Short Message Service) over the GSM (Global System for Mobile) phone network.

Authentication requires that both the phone and the user be verified. That is that the user is actually the one using the cellular phone. Various methods may be used to authenticate the user.

Figure 2:
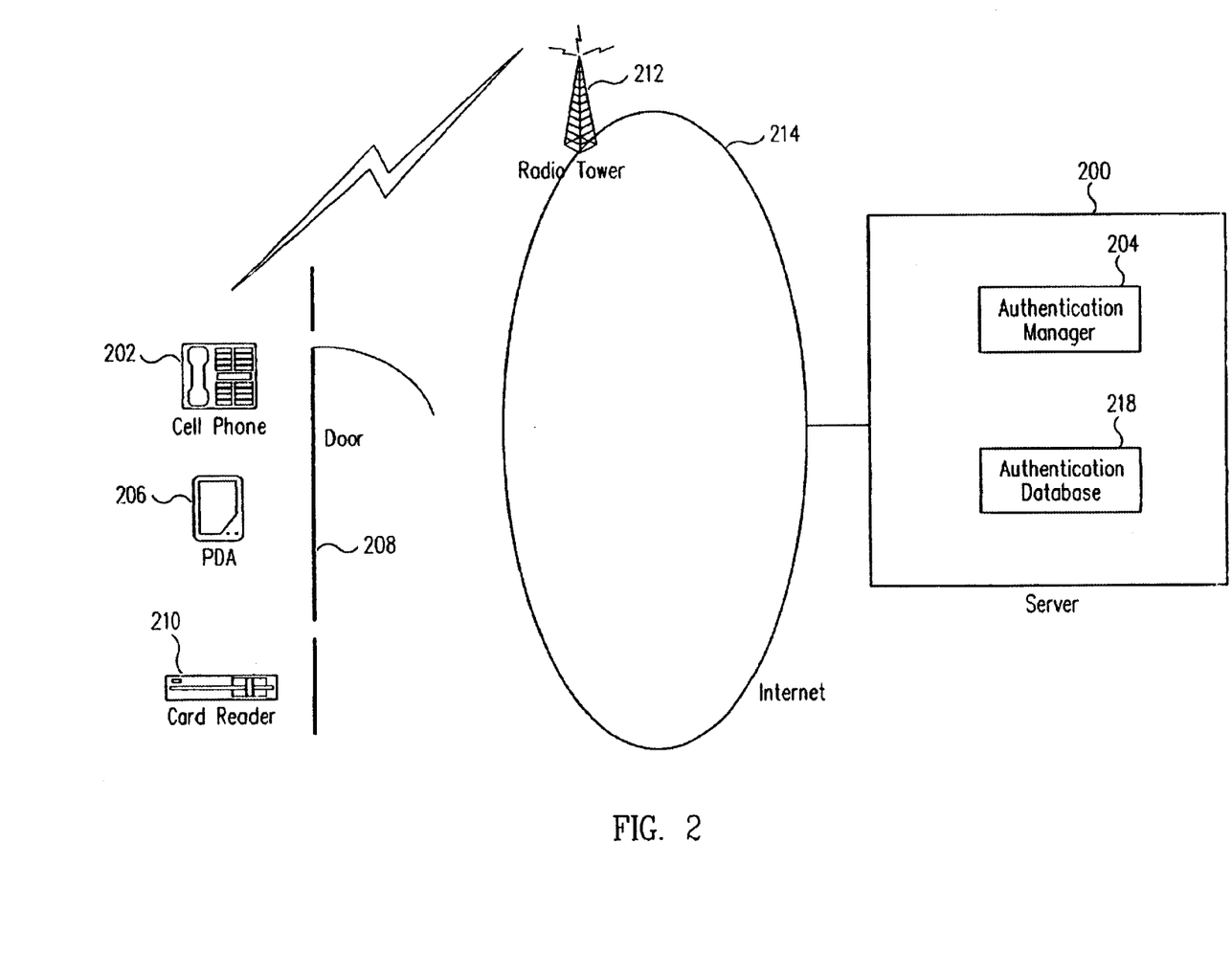
FIG. 2 is an illustration of a network configured to perform authentication service to a door.

In one embodiment of the invention, authentication manager 204 responds to the entry request by initiating an authentication to validate the user. Authentication can include any mechanism that verifies the identity of the user to the system. A key or password known only to the user, or biometrics information can be used to authenticate the user.

In an embodiment of the invention, authentication is performed by verifying a personal identification number (PIN) entered by the user at cellular phone terminal 202. Authentication manager 204 sends a command (i.e., a challenge command) to initiate entry of the user's PIN at cellular phone terminal 202. The cryptographic unit of cellular phone 202 generates a digital signature from the user entry. The digital signature is packaged and transmitted to authentication manager 204 (i.e., a challenge response).

Authentication manager 204 verifies the challenge response with user information (e.g. public certificate, digital signature) retained in authentication database 218, information supplied by the user and information that is generated during authentication. When the user is authenticated, access is granted.

If the expected result is received from the user, authentication manager 204 notifies the server that the user is authentic and the door is opened. Authentication manager 204 is a program that is active on a network server 200, for example.

In another embodiment, the network server 200 calls the users cellular phone 202 as the user approaches the door. The user answers, enters the PIN, and the door opens automatically. This embodiment requires that the door circuitry include a small RF unit to detect approaching users.

In one embodiment of the invention, a user accesses the system by inserting a smart card in a card reader attached to network server. A smart card is a card that is capable of storing information such as in a magnetic strip or memory of the smart card. The smart card may also have processing capability and may be in the form of a cellular phone, a PDA, or combinations thereof. The smart card can store user information such as a user's identification (i.e., user ID such as a 64-bit number) and a secret code (e.g., a 128-bit random number) that is transmitted to network server. The secret code and ID are used during authentication.

In one embodiment of the invention, a user with a PDA unit may request access. For PDA units that support RF wireless technology, the PDA accesses a URL to obtain the authentication code. Upon receipt of the code, a digital signature is generated and sent to the server. The server verifies the signature and if authentic allows access through the door.

For PDA units that do not support RF wireless technology, the unit simply sends authentication codes to the door card reader using IRDA (Infra Red Data Association) or similar protocol to transmit a message authentication sequence to the reader. The reader forwards the authentication sequence to the server which verifies the signature. Once again, access is only granted upon verification.

Authentication for Access to a Network

In one embodiment of the invention, the user may want basic access to a network. Conceptually, this is similar to a login process to a computer. However, the scope is much larger than a normal login. The same processes as in "Authentication for Access to a Door" described above apply for network access. Additionally, the cellular phone could be considered as a personal web server supporting the UPI since the full phone number could be used as the IP address. That is, http://999-999-9999 as full name; however, the shortened version http://999-9999 could be used as the local name for access in a local area. The digital phone is programmable and has a number of URLs that it understands included in the program code.

Authentication to an Application

Figure 3:
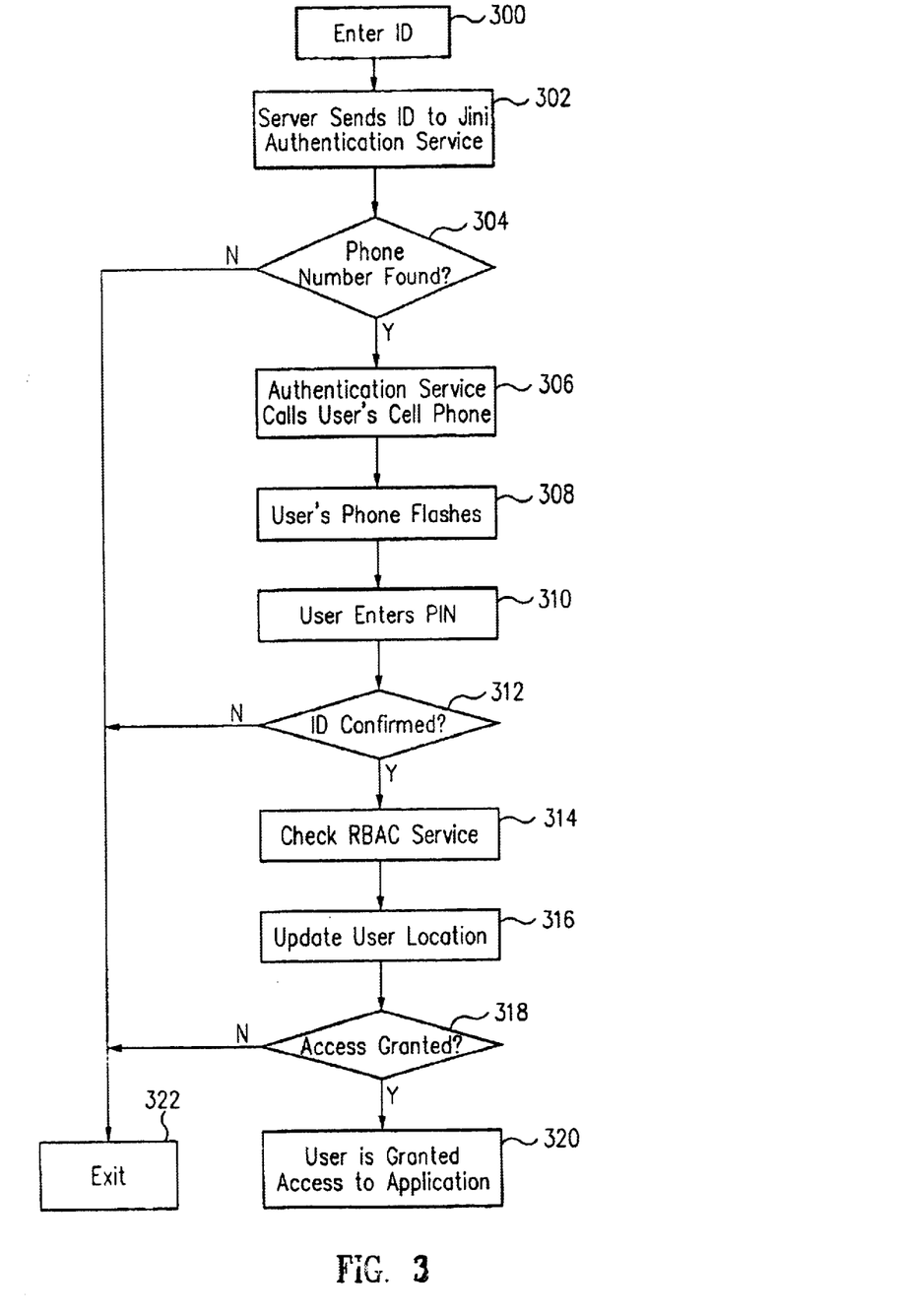
FIG. 3 is an illustration of authentication to an application on a network.

In one embodiment of the invention, the user may want access to a service on the server. FIG. 3 shows a process flow for access to a service. The user approaches a workstation and enters their user identification (ID), at step 300. The workstation is connected to a network server. At step 302, the server sends the user ID to a Jini Authentication service which takes the ID and proceeds to lookup the user's cellular phone number. If at step 304, no phone number is found for the requesting user, access is denied. However, if user is registered and has a phone number, at step 306 the Jini Authentication service calls the users cellular phone. In one embodiment, the user's cellular phone does not ring but only flashes, step 308). A short message may also be included that prompts the user for a PIN.

Upon detecting the request for a PIN, the user enters the PIN on their cellular phone at step 310. The phone's cryptographic unit generates a signature packet and sends the packet using SMS and GSM to the server. Upon confirmation of the user's identity at step 312, the user's request for access to a service is checked in the Role Based Access Control (RBAC) service, step 314. Optionally, the User Location Registry is updated at step 316. In one embodiment, the user's location is further refined if the phone has GPS capability.

Once the authentication of the user is complete, check at step 318, access from the initiating resource (e.g. workstation) is granted at step 320. If however, at step 318 the user is not authentic, access is denied (step 322). Access is also denied if the user identification is not confirmed at step 312.

Embodiment of Computer Execution Environment (Hardware)

Figure 4:
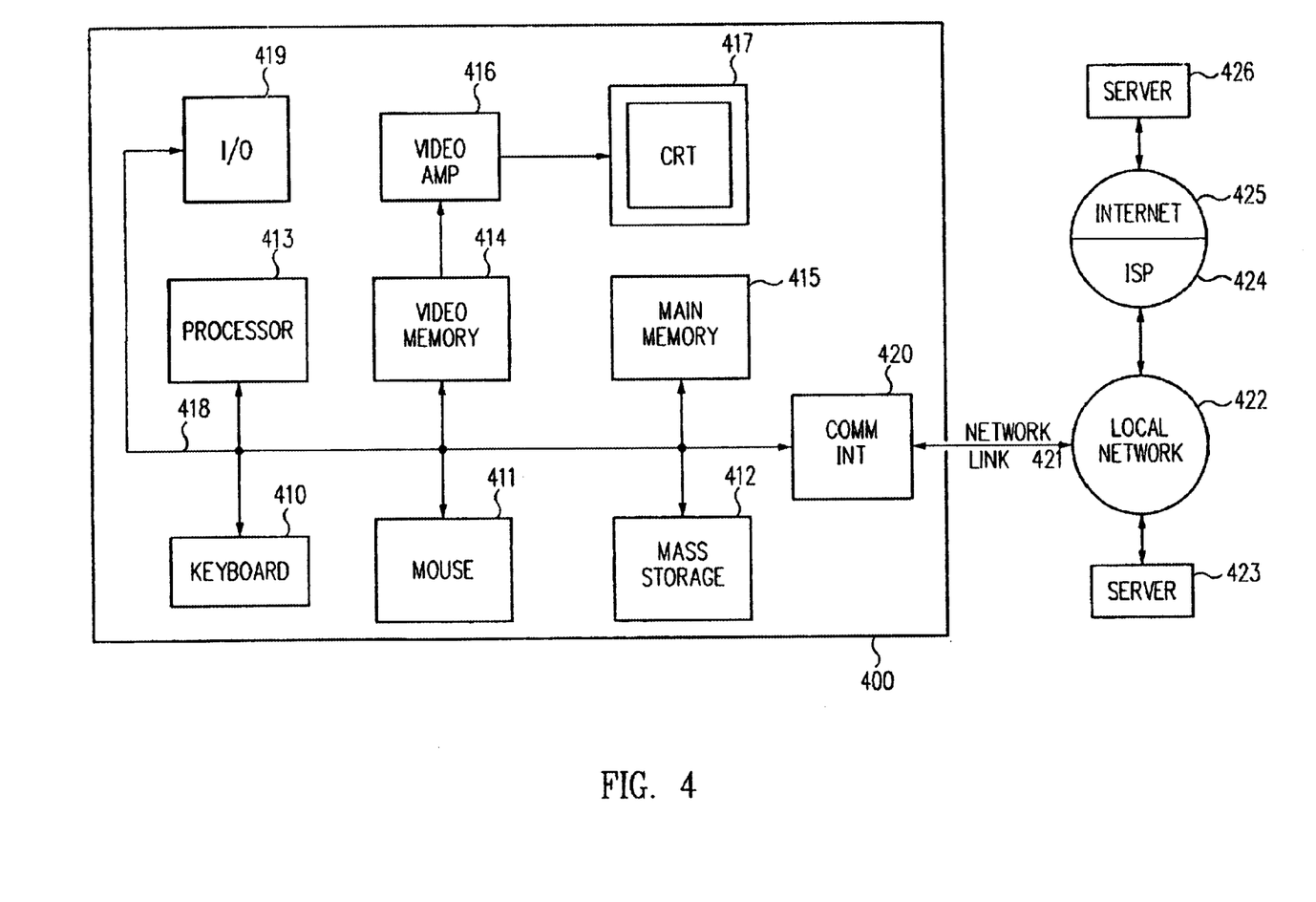
FIG. 4 is a general block diagram of one embodiment of a computer system in which embodiments of the present invention may be implemented.

FIG. 4 illustrates an example of a general-purpose computer that may be utilized to implement an embodiment of the invention. A keyboard 410 and mouse 411 are coupled to a bi-directional system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to bi-directional system bus 418 represents such I/O elements as a printer, A/V (audio/video) I/O, etc.

Computer 400 includes video memory 414, main memory 415 and mass storage 412, all coupled to bi-directional system bus 418 along with keyboard 410, mouse 411 and processor 413. The mass storage 412 may include both fixed and removable media, such as magnetic, optical or magneto-optical storage systems or any other available mass storage technology. Bus 418 may contain, for example, thirty-two address lines for addressing video memory 414 or main memory 415. The system bus 418 also includes, for example, a 64-bit data bus for transferring data between and among the components, such as processor 413, main memory 415, video memory 414 and mass storage 412. Alternatively, multiplex data/address lines may be used instead of separate data and address lines.

In one embodiment of the invention, the processor 413 is a microprocessor manufactured by Motorola, such as one of the PowerPC family of processors, or a microprocessor manufactured by Intel, such as the 80×86, or Pentium family of processors, or a SPAC™ microprocessor from Sun Microsystems™, Inc. However, any other suitable microprocessor or microcomputer may be utilized. Main memory 415 is comprised of dynamic random access memory (DRAM). Video memory 414 may be, for example, a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images. Alternatively, the video memory could be used to drive a flat panel or liquid crystal display (LCD), or any other suitable data presentation device.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Communication interface 420 could also be a cable modem or wireless interface. In any such implementation, communication interface 420 sends and receives electrical, electromagnetic or optical signals that carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 424. ISP 424 in turn provides data communication services through the world wide packet data communication network now commonly referred to as the "Internet" 425. Local network 422 and Internet 425 both use electrical, electromagnetic or optical signals that carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420. Processor 413 may execute the received code as it is received, and/or stored in mass storage 412, or other non-volatile storage for later execution. In this manner, computer 400 may obtain application code via a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves. The computer systems described above are for purposes of example only. An embodiment of the invention may be implemented in any type of computer system or programming or processing environment.

Although the present invention has been described in considerable detail with regard to the preferred versions thereof, other versions are possible. Therefore, the appended claims should not be limited to the descriptions of the preferred versions contained herein.

We claim:

1. A method comprising:

providing a federation of computers and computing devices, said federation appearing as a single system to a user of said federation;

providing a first service, said first service participating in said federation;

initiating a request for said first service; said request being initiated by said user via a second service, said second service participating in said federation;

requesting authentication of said second service, said authentication being requested by said first service;

presenting authentication, said authentication being presented by said second service;

verifying said authentication, said authentication being verified by said first service; and granting access to said first service, thereby enabling said second service to said first service.

2. The method of claim 1, further comprising collecting payment for said first service via said federation.

3. The method of claim 1, wherein said second service is a cellular phone.

4. The method of claim 1, wherein said second service is a Personal Data Assistant.

5. The method of claim 1, wherein said second service is a smart card.

6. The method of claim 1, wherein said requesting authentication further comprises:

generating a digital signature; and verifying said digital signature with a public certificate.

* * * * *